(12) United States Patent
Gutierrez

(10) Patent No.: US 9,781,405 B2
(45) Date of Patent: Oct. 3, 2017

(54) THREE DIMENSIONAL IMAGING WITH A SINGLE CAMERA

(71) Applicant: MEMS DRIVE, INC., Arcadia, CA (US)

(72) Inventor: Roman Gutierrez, Arcadia, CA (US)

(73) Assignee: MEMS Drive, Inc., Arcadia, CA (US)

( * ) Notice: Subject to any disclaimer, the term of this patent is extended or adjusted under 35 U.S.C. 154(b) by 224 days.

(21) Appl. No.: 14/580,919

(22) Filed: Dec. 23, 2014

(65) Prior Publication Data

US 2016/0182887 A1 Jun. 23, 2016

(51) Int. Cl.
- *H04N 13/02* (2006.01)
- *H04N 13/00* (2006.01)
- *H04N 5/228* (2006.01)
- *G06K 9/64* (2006.01)
- *G06T 7/593* (2017.01)

(52) U.S. Cl.
CPC ......... *H04N 13/0207* (2013.01); *G06T 7/593* (2017.01); *H04N 2013/0081* (2013.01)

(58) Field of Classification Search
CPC ................. H04N 13/0207; H04N 13/0221
USPC .......................................................... 348/46
See application file for complete search history.

(56) References Cited

U.S. PATENT DOCUMENTS

| | | | |
|---|---|---|---|
| 6,552,742 B1 | 4/2003 | Seta | |
| 8,780,174 B1 * | 7/2014 | Rawdon | H04N 5/23258 348/43 |
| 2008/0221450 A1 * | 9/2008 | Kim | A61B 8/08 600/443 |
| 2008/0266413 A1 * | 10/2008 | Cohen | G06T 5/20 348/222.1 |
| 2011/0304706 A1 * | 12/2011 | Border | G03B 35/02 348/50 |
| 2012/0242794 A1 | 9/2012 | Park et al. | |
| 2012/0242795 A1 | 9/2012 | Kane et al. | |
| 2012/0242796 A1 * | 9/2012 | Ciurea | H04N 5/232 348/46 |

(Continued)

FOREIGN PATENT DOCUMENTS

WO 2016103024 A2 6/2016

OTHER PUBLICATIONS

International Search Report and Written Opinion of the International Searching Authority issued in Application Serial No. PCT/IB2015/002417.

*Primary Examiner* — Hee-Yong Kim
(74) *Attorney, Agent, or Firm* — Brian J. Colandreo; Michael T. Abramson; Holland & Knight LLP

(57) ABSTRACT

Systems and methods provide accurate pixel depth information to be applied to a single image taken by a single camera in generating a three-dimensional (3D) image. In particular, two or more images can be captured during, e.g., lateral movement of a camera to ascertain depth in a scene on a pixel level. Use of an optical image stabilization (OIS) system that can provide at least three axes of stabilization eliminates the variability associated with conventional systems that create problems with image registration. Further still, and because actual pixel depth information is being calculated rather than merely generating stereoscopic images to trick the eyes into perceiving depth, the pixel depth information that is calculated can be leveraged in other ways, such as for providing automated measurements merely by taking a picture of an object or scene.

27 Claims, 10 Drawing Sheets

(56) References Cited

U.S. PATENT DOCUMENTS

2012/0293627 A1 11/2012 Ishii
2013/0063566 A1 3/2013 Morgan-Mar et al.
2013/0250053 A1* 9/2013 Levy .................. H04N 13/0207
                                                          348/43

* cited by examiner

THREE DIMENSIONAL IMAGING WITH A SINGLE CAMERA

TECHNICAL FIELD

The present disclosure relates generally to electro-mechanical devices and systems, such as microelectromechanical systems (MEMS). More particularly, various embodiments of the technology disclosed herein are directed to the creation of three dimensional (3D) images and performing automatic measurements using a single camera through pixel depth determinations.

BACKGROUND 3D imaging, also referred to as stereoscopy, can refer to various techniques for creating or enhancing the illusion of depth in an image. Traditional 3D imaging generally relies on stereopsis (the perception of depth and 3D structure), which can be obtained on the basis of visual information gathered, e.g., by two eyes, as in humans with normal binocular vision. That is, when eyes are positioned at different lateral locations, two slightly different images are projected to the retinas of the eyes, which leads to depth perception. Accordingly, such traditional 3D imaging techniques seek to imitate this stereopsis by using two images that are slightly offset and combining the two images or presenting the two images such that the eyes are given the perception or illusion of 3D depth. More recent 3D imaging techniques have attempted to eschew the use of dual images by obtaining depth information with alternative methods, but such methods may have limited application and/or can present safety issues.

SUMMARY

Systems and methods are provided in various embodiments for 3D imaging using a single camera. In accordance with one embodiment of the technology disclosed herein, a method comprises capturing a first image with a camera, and capturing at least a second image subsequent to lateral movement of the camera. The method further comprises computing the amount of the lateral movement, and determining a direction of the lateral movement. Correlation of pixels in the first and second images in the direction of the lateral movement is performed. A peak of correlation is computed for each pixel in the direction of the lateral movement, and distance for each pixel based on the peak of the correlation and the amount and the direction of the lateral movement is also computed.

In accordance with another embodiment of the technology disclosed herein, another method comprises capturing an image with a camera during lateral movement of the camera. The method further comprises computing the amount of the lateral movement, and determining a direction of the lateral movement. Further still, the method comprises performing a computation of the blur or sharpness in the direction of the lateral movement, and computing distance for each pixel based on the blur and the amount and the direction of the lateral movement to determine pixel depth of each pixel.

In accordance with yet another embodiment of the technology disclosed herein, a device comprises memory configured to store instructions, and a processor, operatively coupled to the memory and configured to execute the instructions. The instructions cause the processor to: capture a first image with a camera; capture at least a second image subsequent to lateral movement of the camera; compute the amount of the lateral movement; determine a direction of the lateral movement; perform correlation of pixels in the first and second images in the direction of the lateral movement; compute peak of correlation for each pixel in the direction of the lateral movement; and compute distance for each pixel based on the peak of the correlation and the amount and the direction of the lateral movement.

In accordance with still another embodiment, a device comprises memory configured to store instructions, and a processor, operatively coupled to the memory and configured to execute the instructions. The instructions cause the processor to: capture a first image and a second image with a camera, wherein the effective orientation of the camera is stabilized in at least three axes to compensate for roll, pitch, and yaw movements, and wherein capturing the second image is performed subsequent to lateral movement of the camera; compute the amount of the lateral movement; determine a direction of the lateral movement; perform correlation of pixels in the first and second images in the direction of the lateral movement; compute peak of correlation for each pixel in the direction of the lateral movement; and compute distance for each pixel based on the peak of the correlation and the amount and the direction of the lateral movement.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
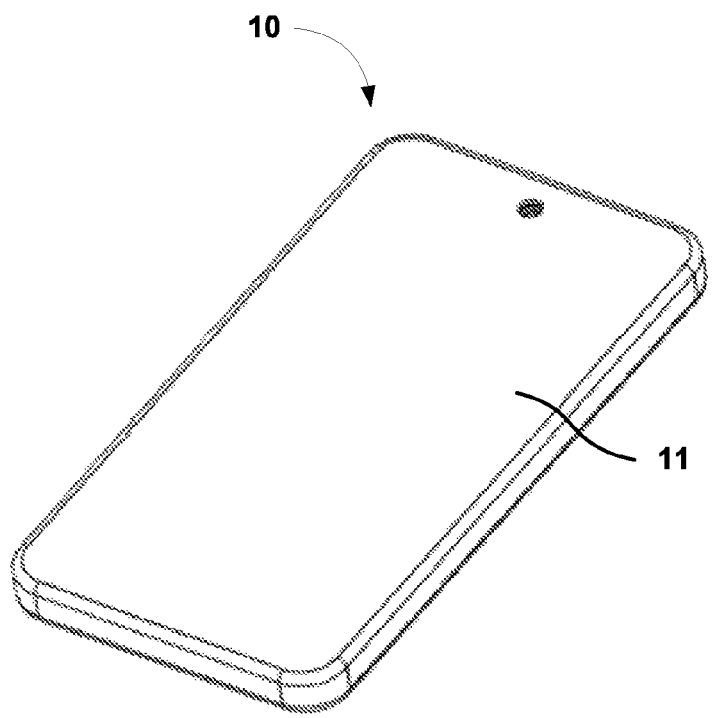
FIG. 1A is a perspective view of an example mobile device in which various embodiments of the technology disclosed herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As alluded to above, traditional methods of 3D imaging rely on the combination of at least two pictures or images to create the illusion of depth. The creation of the at least two images in conventional 3D imaging systems often rely on two common types of cameras for capturing a 3D image with depth detail. A first conventional type of camera can be referred to as a computational camera. Computational cameras generate multiple views of a desired scene, image, object, etc. through either the use of lens arrays on a single image sensor or through the use of multiple cameras. A second type of conventional camera utilizes a sensor coupled with an active non-visible lighting source to acquire depth information. This depth information can be translated into a depth map which may then be "overlaid" or otherwise combined with traditional image data from a traditional camera.

However, issues can exist with such conventional methods of 3D imaging. For example, when using multiple cameras to capture a 3D image, each camera will have slightly different characteristics, such as focal length, distortion, magnification, shading, color filters, etc., making it quite difficult to spatially register the multiple images with each other, i.e., join the multiple images together to generate an accurate depth map at the pixel level. Except at well-demarcated edges between objects in a scene, for example, the differences in color and intensity between neighboring pixels can easily overshadow the changes caused by the parallax from one camera to another camera. The same is true of different sensors and/or different lenses in a lens array, even if used in the same camera.

When relying on active illumination, on the other hand, conventional 3D imaging becomes a more complex process, and the resolution of a resulting image is typically lower than that of the image sensor. Additionally, the active illumination can be easily overpowered by daylight, making such systems viable only in indoor imaging scenarios or in situations where the active illumination can reach the object of interest. Further still, eye safety health risks may potentially be associated with the use of certain active lighting sources, such as infrared light sources.

Moreover, conventional 3D imaging techniques for capturing stereoscopic images with a single camera simply do not possess the accuracy necessary to generate depth information on the pixel level, i.e., to generate a pixel level depth map. That is, and as a camera is moved, the resulting tilt or other movement of the camera creates shifts that require/rely on image registration processes or algorithms to achieve proper alignment, and image registration in conventional systems is often imprecise. That is, image registration, which refers to the process of transforming different data or sets of data (e.g., from multiple images) into one coordinate system or aligning the images, is compromised due to these shifts. Image registration is necessary in order to be able to compare or integrate data obtained from different measurements and/or data sources (such as different images). Moreover, such processing and algorithms are computationally intensive, requiring either higher capability processors, extensive computation time, or both. In the case of cameras implemented in mobile devices that have a smaller or more limited battery power source, this may result in an unacceptably large power drain on the mobile devices themselves (which can also result from the use of active illumination). Still other issues arise in that when multiple photographs or images are used to generate a final, composite image, any sort of object motion in the scene captured by the photographs/images results in image artifacts, which are difficult to compensate for or remove/reduce.

Therefore, various embodiments of the technology disclosed herein are directed to calculating accurate pixel depth information, and applying that accurate pixel depth information to a single image taken by a single camera. As a result, the aforementioned issues associated with 3D image generation can be largely or even completely avoided. In particular, two or more images can be captured during, e.g., lateral movement of a camera to ascertain depth in a scene on a pixel level. Only one of the two or more images is needed to create the 3D image, where the remaining captured images need only be used for determining the pixel depth information. It should be noted that various embodiments contemplate the use of an optical image stabilization (OIS) system/mechanism that can provide at least three axes of stabilization. In this way, the variability associated with conventional systems that create problems with image registration can be eliminated. That is, image registration is performed much more easily and more accurately with regard to pixel depth information calculation because, e.g., pitch, roll, and yaw movement of the camera can be avoided with the OIS, leaving only the lateral component (which is desired in this case), and perhaps movement of the camera forward and backward, which can have a negligible effect or can be addressed with focus adjustment.

Further still, and because actual pixel depth information is being calculated rather than merely generating stereoscopic images to trick the eyes into perceiving depth, the pixel depth information that is calculated can be leveraged in other ways, such as for providing automated dimensional measurements merely by taking a picture of an object or scene. Further still, 3D image manipulation can be performed accurately, e.g., for background subtraction, object insertion, and imparting various post-processing image effects, such as Bokeh. For example, 3D objects can be inserted into or removed from an image because the proper depth information of objects in an image can be determined so that the resulting scale and depth due to any image manipulation is correct.

FIG. 1A illustrates a perspective view of an example mobile device 11, which can be a mobile phone, that contains a miniature camera 12 in which various embodiments may be implemented. Miniature camera 12 may employ an image sensor package, such as a moving image sensor package. Sizing of miniature camera 12 can be optimized to facilitate the incorporation of miniature camera 12 within or as part of mobile device 11. For example, the overall thickness of miniature camera 12 may be less than that of mobile device 11 so that miniature camera 12 can be incorporated within mobile device 11 to present a consumer-friendly design. Additionally, other dimensions of miniature camera 12 may also be sized appropriately to allow other components to fit inside, e.g., the housing or enclosure of mobile device 11. Miniature camera 12 may achieve various functionality related to image sensor movement, such as OIS, automatic focusing (AF), alignment between lens and image sensor, and the like.

Figure 1B:
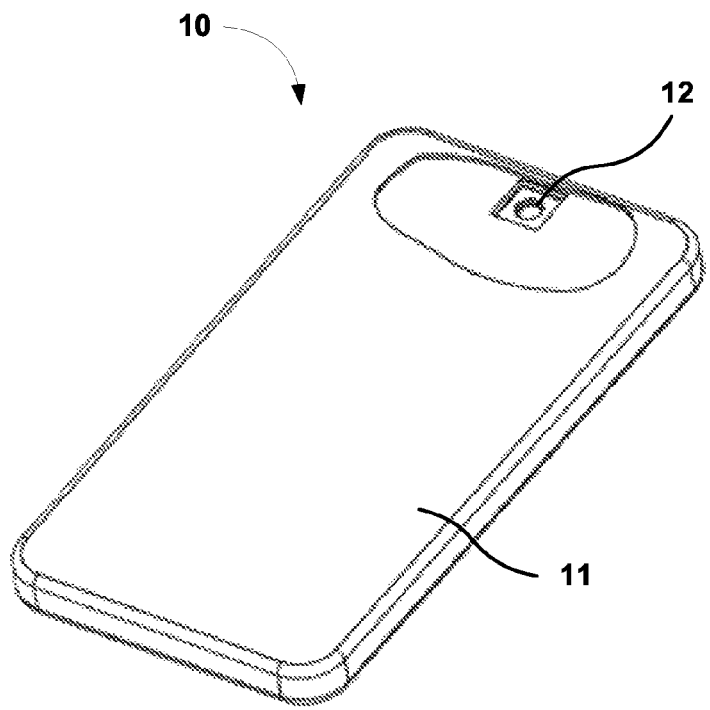
FIG. 1B is a breakout perspective view of the example mobile device of FIG. 1A.

FIG. 1B illustrates mobile device 10 of FIG. 1A with the housing/enclosure partially exposed to reveal miniature camera 12 in accordance with one embodiment of technology disclosed herein. It should be noted that although various embodiments disclosed herein are presented in the context of miniature camera modules for use in mobile devices, such as mobile phones, tablet personal computers (PCs), laptop PCs, and the like, the disclosed technology can be adapted for use in other devices or contexts, such as larger format cameras, medical imaging, large scale imaging, video, etc.

Figure 2A:
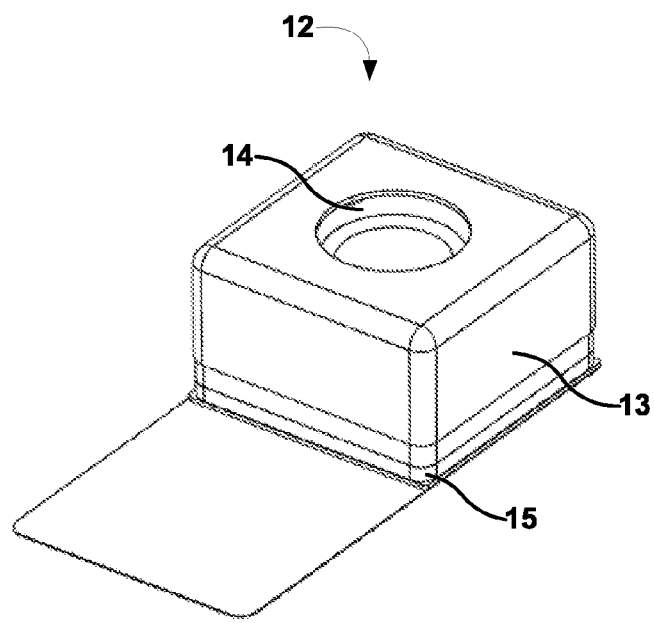
FIG. 2A is a perspective view of an example camera module that may be implemented in the mobile device of FIG. 1A in accordance with various embodiments of the technology disclosed herein

FIG. 2A illustrates a perspective view of miniature camera 12. Miniature camera 12 can include an electromagnetic interference (EMI) shield 13, a lens barrel 14, and a moving image sensor package 15. Lens barrel 14 may be aligned and mounted to moving image sensor package 15 using commercial active alignment equipment. EMI shield 13 may be attached after barrel assembly or may be mounted to lens barrel 14 prior to assembly of moving image sensor package 15. During camera module design and manufacturing, lens barrel 14 may be modified to achieve a desired optical performance, such as but not limited to: field of view; optical transfer function; stray light; ghosting; chromatic aberration; distortion; and focusing range. Moreover, and further during camera module design and manufacturing, lens barrel 14 may be modified to achieve a desired mechanical performance, such as but not limited to: thickness; width; and shape. The aforementioned lens barrel modifications may be made substantially independent of moving image sensor package 15. Conversely, changes may be made to the moving image sensor package 15 can be made substantially independent of lens barrel 14.

Figure 2B:
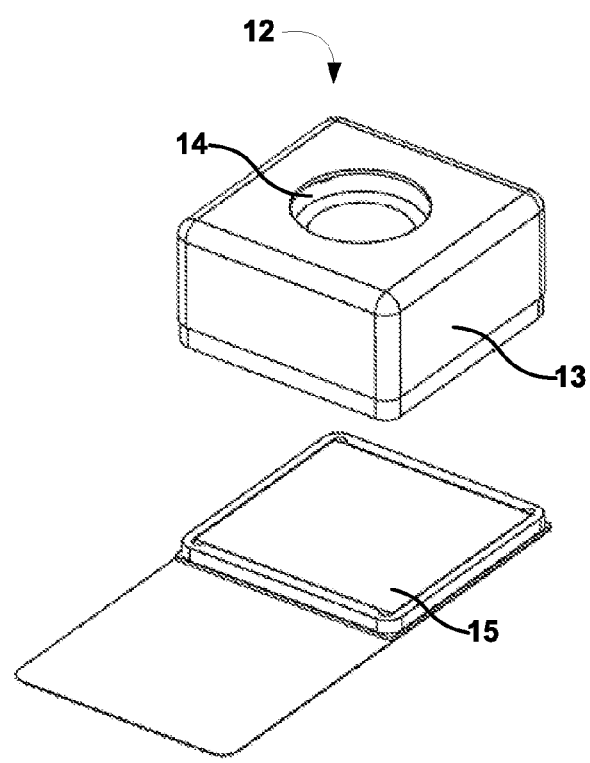
FIG. 2B is an exploded perspective view of the example camera module of FIG. 2A.

FIG. 2B illustrates a partially exploded view of miniature camera 12 with a moving image sensor package 15. The EMI shield 13 is shown as being attached to lens barrel 14 and separated from moving image sensor package 15. The moving image sensor package 15 is relatively thin and substantially the same thickness as a conventional non-moving image sensor package.

Figure 3A:
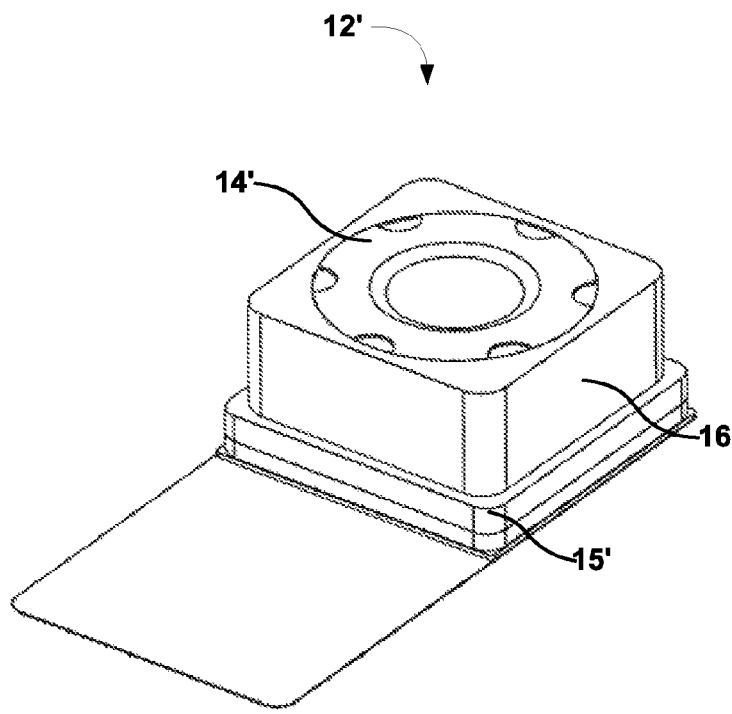
FIG. 3A is a perspective view of another example camera module that may be implemented in the mobile device of FIG. 1A in accordance with various embodiments of the technology disclosed herein.

FIG. 3A illustrates a perspective view of another example miniature camera 12' that does not incorporate an EMI shield in accordance with another embodiment. For example, the EMI shield may have been removed, or omitted entirely as a design option of miniature camera 12'. Miniature camera 12', similar to miniature camera 12, may include a lens barrel 14', an autofocus (AF) actuator 16, and a moving image sensor package 15'. The AF actuator 16 may be a voice coil motor (VCM) type of actuator, a MEMS actuator, a piezoelectric actuator, a shape memory alloy actuator, or any other type of actuator. The AF function may also be achieved using a tunable lens, such as a liquid lens, a liquid crystal lens, a deformable polymer lens, or the like.

As alluded to previously, various embodiments of the technology disclosed herein can employ OIS functionality, such as three axis OIS that is operative or can compensate for camera movement involving roll, pitch, and yaw. It should be noted that such OIS features can be added to miniature camera 12' without requiring any changes to the AF actuator 16 or lens barrel 14. The motion of an image sensor inside moving image sensor package 15 can be used to compensate for camera pointing temporal variations. It should be noted that camera size may be limited either by the size of lens barrel 14 or the size of AF actuator 16 and the thickness of the moving image sensor package 15. Moreover, AF actuator 16 may electrically connect to moving image sensor package 15.

Figure 3B:
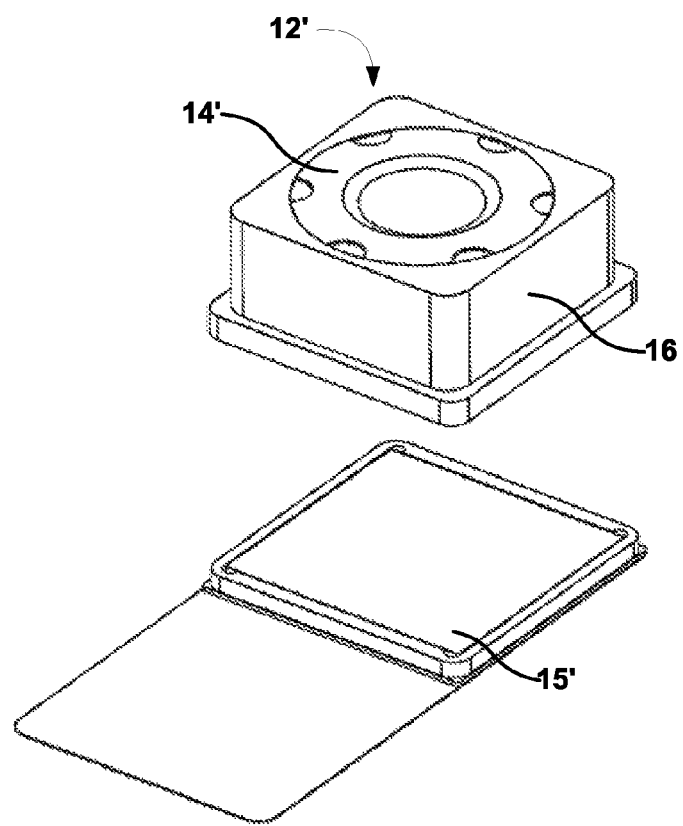
FIG. 3B is an exploded perspective view of the example camera module of FIG. 3A.

FIG. 3B illustrates a partially exploded view of miniature camera 12' with a moving image sensor package 15' of FIG. 3A. The lens barrel 14' is shown as being attached to the AF actuator 16 and separated from moving image sensor package 15. Moving image sensor package 15 can be relatively thin and substantially the same thickness as a conventional image sensor package where the image sensor is not moving.

Figure 4:
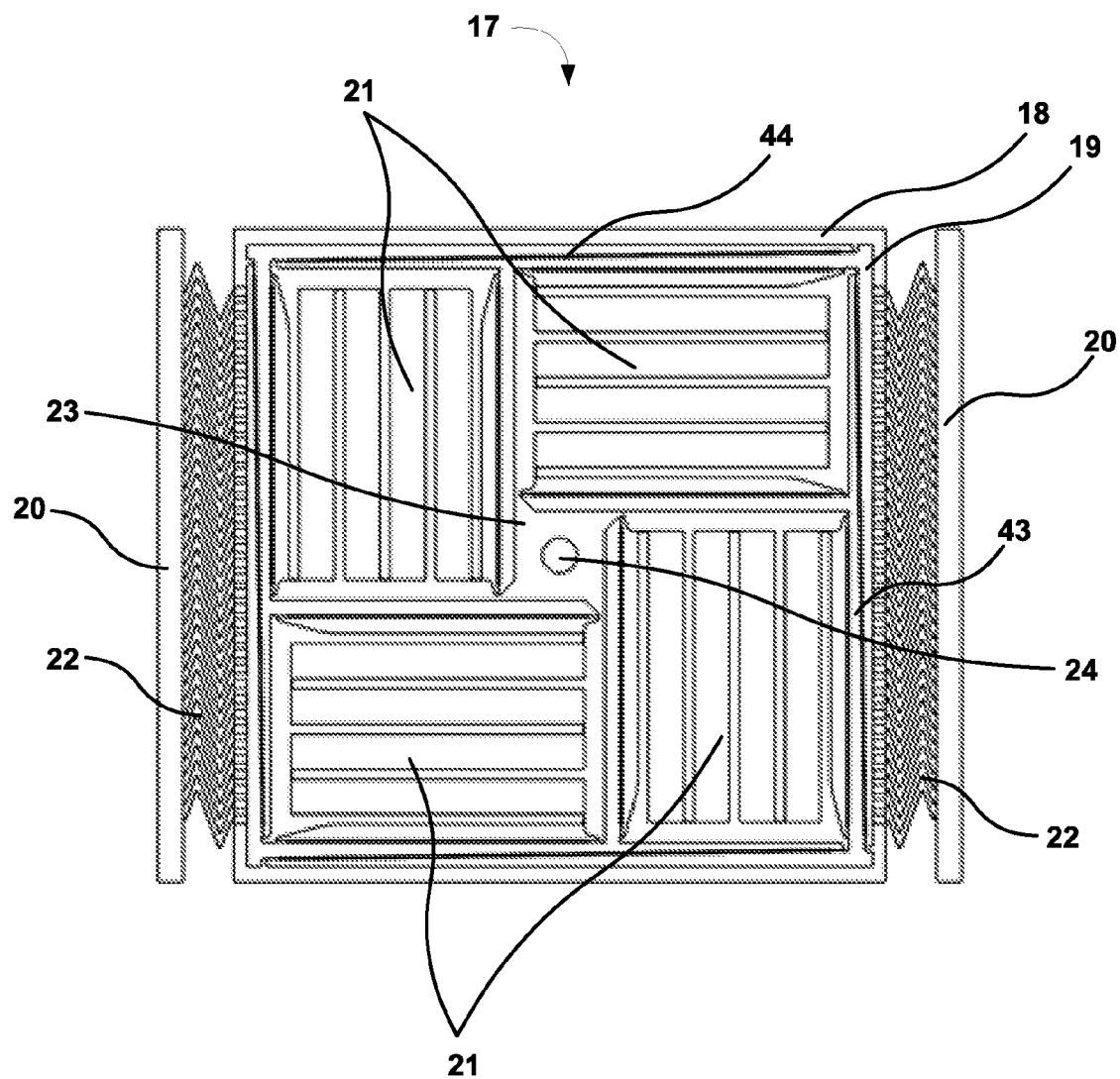
FIG. 4 is a top view of an example MEMS actuator utilized in accordance with various embodiments of the technology disclosed herein.

FIG. 4 illustrates a top planar view of an example MEMS actuator 17 that can be utilized to implement the aforementioned 3 axes OIS functionality in accordance with various embodiments of the technology disclosed herein. MEMS actuator 17 can be used to move the image sensor inside the moving image sensor package, e.g., moving image sensor package 15' of FIGS. 3A and 3B. In one embodiment, MEMS actuator 17 is designed to move the image sensor in accordance with "three degrees of freedom" in order to enable OIS in a miniature camera module (such as miniature camera 12' of FIGS. 3A and 3B) in all three rotational degrees of freedom.

Some examples of MEMS actuators suitable for moving an image sensor are described in U.S. Application Ser. No. 61/975,617 which is incorporated herein by reference in its entirety. In one embodiment, MEMS actuator 17 can include a middle frame 18 with contact pads 19, an outer frame separated into two electrical bars 20, four actuation areas 21, a central anchor 23 with a glue hole 24, and a plurality of electrical connection flexures 22. The number of glue holes 24 is not limited to one, as there may be multiple holes depending on the relevant electrical connection requirements. The glue hole 24 may have multiple purposes including, e.g., enabling a structural bond to mount MEMS actuator 17 to a carrier substrate by applying thermal epoxy, as well as enabling an electrical connection from MEMS actuator 17 to a conductive trace or substrate by applying conductive epoxy, solder, metal pastes, or other electrical connection methods. The outer electrical bars 20 can provide connections between the MEMS actuator 17 and the rest of the moving image sensor package. Contact pads 19 on middle frame 18 can provide electrical connections between the image sensor (not shown) and MEMS actuator 17.

Each actuation area 21 may contain electrostatic comb drives that provide motive force in one linear direction. The four actuation areas 21 together provide movement in the X and Y directions, and rotation about the Z axis. MEMS actuator 17 can therefore move in two linear degrees of freedom and one rotational degree of freedom to achieve OIS of a miniature camera in all three rotational degrees of freedom. The actuation areas 21 are connected to the central anchor 23 through parallel motion control flexures 43 and to the middle frame 18 through connection flexures 44 that are stiff in the motion degree of freedom and soft in other degrees of freedom. In one embodiment, actuation areas 21 includes features that limit mechanical movement during drop or shock to reduce the stress on the parallel motion control flexures 43 and the connection flexures 44. In one embodiment, the image sensor is attached to the outer frame 20 and the central anchor 23, while the middle frame 18 is attached to the rest of the moving image sensor package.

It should be noted that the X/Y dimensions of MEMS actuator 17 are related to the moving image sensor package size. In one embodiment, the outline dimensions of the middle frame 18 substantially match the size of the image sensor. In another embodiment, the outline dimensions of the outer frame 20 substantially match the size of the image sensor. In still another embodiment, the thickness of the MEMS actuator 17 is approximately 150 micrometers and the in-plane dimensions are approximately 8 mm in the X dimension and 6 mm in the Y dimension.

Figure 5:
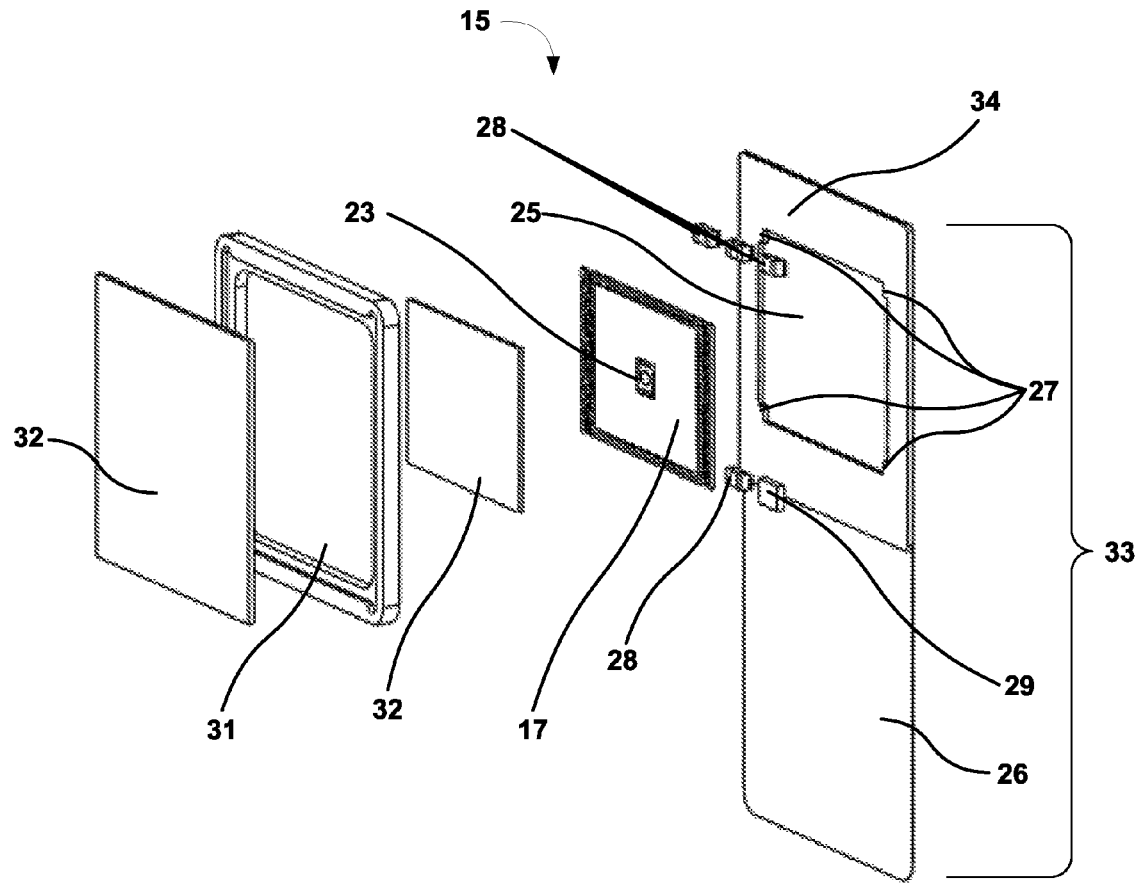
FIG. 5 is an exploded perspective view of an example image sensor package utilized in accordance with various embodiments of the technology disclosed herein.

FIG. 5 is an exploded perspective view of moving image sensor package 15 in accordance with one embodiment of the technology disclosed herein. Moving image sensor package 15 can include, but are not limited to the following components: a substrate 33; a plurality of capacitors or other passive electrical components 28; a MEMS actuator driver 29; a MEMS actuator 17; an image sensor 30; an image sensor cap 31; and an infrared (IR) cut filter 32. Substrate 33 can include a rigid circuit board 34 with an opening 25 and in-plane movement limiting features 27, and a flexible circuit board acting as a back plate 26. The rigid circuit board 34 may be constructed out of ceramic or composite materials such as those used in the manufacture of plain circuit boards (PCB), or some other appropriate material(s). Moving image sensor package 15 may include one or more drivers 29. It should be noted that the shape of opening 25 is designed to fit MEMS actuator 17, and may provide in-plane movement limiting features 27 on the corners if needed to improve the in-plane drop performance. The size of opening 25 is adjustable based on the size of the image sensor 30.

The back plate 26 may include embedded copper traces and features, which, besides routing electrical signals, may also function as a spacer to control the z-gap between the back plate 26 and the MEMS actuator 17. Since the thermal conduction of air is roughly inversely proportional to the gap, and the image sensor 30 can dissipate a substantial amount of power between 100 mW and 1 W, the gaps between the image sensor 30, the stationary portions of the MEMS actuator 17, the moving portions of the MEMS actuator 17, and the back plate 26 are maintained at less than approximately 50 micrometers. In one embodiment, the back plate 26 can be manufactured out of a material with good thermal conduction, such as copper, to further improve the heat sinking of the image sensor 30. In one embodiment, the back plate 26 has a thickness of approximately 50 to 100 micrometers, and the rigid circuit board 34 has a thickness of approximately 150 to 200 micrometers. In one embodiment, the MEMS actuator fixed portion 23 is attached to the back plate 26 by thermal epoxy through the glue hole 24.

As described above, 3D imaging can be accomplished by moving a single camera laterally while capturing two or more images. One advantage of using a single camera is that certain characteristics or parameters of the single camera can be matched between two or more pictures, including, e.g., the focal length, magnification, color, shading, etc. This differs from conventional systems and methods that rely, for example, on the use multiple cameras, lenses, and/or sensors, where such characteristics will differ between each of the multiple devices utilized to capture each image or picture.

As also described above, various embodiments use three axis OIS. The advantage to using such a comprehensive OIS system is the ability to compensate for substantial shifts in angles between images. That is, movement of a camera includes both angular changes and lateral changes, thus making it incorrect to interpret every shift in the image with a change in parallax. Hence, three axis OIS ensures that there is no substantial shift in angle between photographs, allowing photographs to be captured looking in the same direction. As a result, the shift in objects captured in the photographs can then be used to interpret distance with substantial accuracy, and ultimately depth. Without OIS, if the camera is moved, whether the object motion is caused by camera tilt or by perspective change is unknown. With OIS, as described herein, the motion of an object can be distinguished from that of motion of the camera. Examples of OIS that can be implemented in the technology disclosed herein can be found in U.S. Pat. No. 8,768,157, and U.S. Patent Application Ser. No. 62/003,421, each of which is incorporated herein by reference in its entirety. It should be noted that the technology disclosed herein need not be limited to or exclusively reliant upon three axis OIS, but can also operate in the context of other OIS systems/methods. However, compensation for more camera movements with OIS can make the pixel depth processes and/or computations disclosed herein simpler to perform, and at least initially, more accurate.

Another issue arises in conventional systems when capturing two images at different times. In particular, if there is any movement of an object in the scene between the times the images are captured, the shift in the image will be confused with perspective change due to camera movement. As a result, object movement can affect the pixel to pixel correlation between images, and therefore impact depth calculations/estimations. In the technology disclosed herein, this issue can be avoided by tracking the movement of the camera between photographs with another sensor(s), such as an accelerometer. Moreover, an accelerometer is useful to assist in accurately calculating the distance for each pixel can be based upon correctly ascertaining any lateral movement experienced by the camera between the capturing of two or more images. Additionally still, the accelerometer can be used for determining the direction of lateral movement, which may further simplify this calculation because the direction of pixel correlation is already known. As will be described below, resident sensors on a mobile device can be utilized as well as the aforementioned MEMS actuator, other dedicated sensor(s), or some combination thereof. Accordingly, various embodiments have particular efficacy in scenarios when the images that are being captured involve object movement, such as action shots, or macro photography where slight variances in environmental conditions such as wind, for example, can affect an object of interest, such as the petals on a flower.

By determining the actual direction of movement of the camera itself, any other movement detected in a captured image in other directions can be discriminated. However, if multiple pictures are taken while moving the camera laterally and an object of interest is also moving laterally, it might be difficult to distinguish between the two directions of movement. The same can be true when capturing images such as monotone-colored/flat surfaced objects such as walls or in portions of an image such as edges where objects may drop out of frame by the time a subsequent image is captured. In these instances, however, where depth information cannot be obtained, filtering can be performed to interpolate data from "nearby" or "related" data/information.

In order to distinguish between actual object movement and camera movement, various embodiments can utilize different methods of motion detection. For example, and in accordance with one embodiment, multiple photographs may be taken in quick succession to help further distinguish between pixel movement caused by object motion and that caused by camera motion. As another example, a user may move the camera in a circular motion while an object of interest is moving. Because the movement of the camera can be determined through the use of one or more sensors, its circular movement can be distinguished from that of the object if the object is moving, e.g., laterally. Other distinguishing camera movements can be made as well or in addition to those above, such as back and forth movements while taking multiple images.

As a result, the direction of pixel shift caused by camera movement will be different for each photograph, while the direction of pixel shift caused by object movement is constant for all photographs. As long as the movement of the camera is different than the object movement, the pixel shift will be distinguishable, allowing the depth of each pixel to be obtained. Moreover, the motion of the object as well as the speed of its movement will be known. As an added advantage, the scene behind an object will also be measured as the object moves to a new position, so there will be information about the scene behind the object, e.g., background elements.

Figure 6:
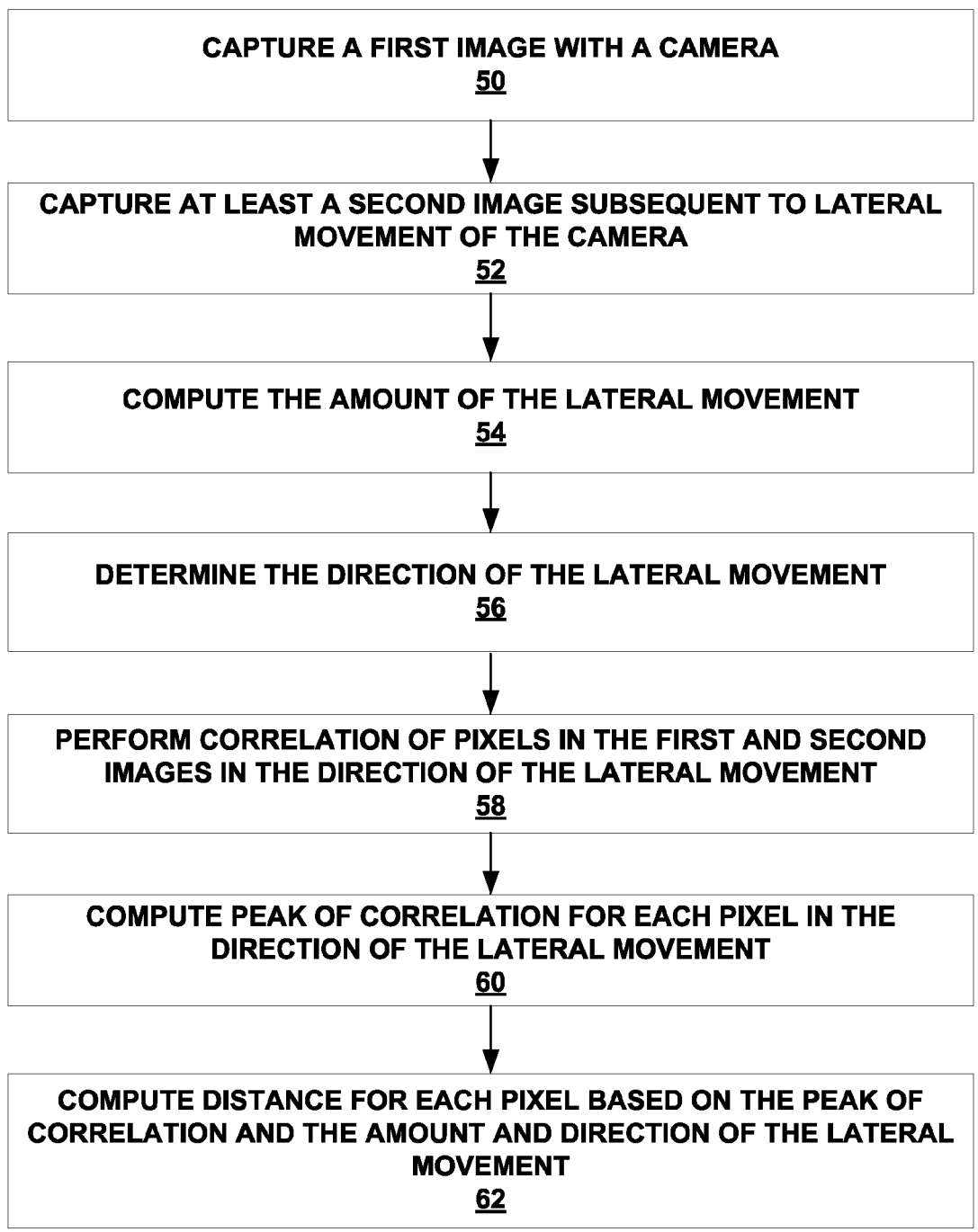
FIG. 6 is an operational flow chart illustrating example processes performed for achieving three dimensional imaging in accordance with various embodiments of the technology disclosed herein.

FIG. 6 is an operational flow chart illustrating example processes performed for determining pixel depth in accordance with various embodiments. At operation 50, a first image can be captured with a camera. Again, only a single camera is utilized in 3D imaging in accordance with various embodiments. At operation 52, at least a second image can be captured subsequent to some lateral movement of the camera. It should be noted that as utilized herein, the concept of "lateral" motion or movement refers to movement in the X-Y plane. Other movements such as pitch, yaw, and roll are effectively cancelled by the OIS operation. As previously noted, this lateral movement can be circular motions, back and forth motions, or simply shifting/moving the camera horizontally, vertically, diagonally, etc. within the X-Y plane. In accordance with one embodiment, a user can determine what lateral movement to impart on the camera and/or when and how many images are captured. In accordance with another embodiment, the user is presented with notifications and/or suggested tips for movement and image capture. Tilt or forward-back motions can be compensated for by focus or may simply be negligible.

At operation 54, the amount of the lateral movement between the first and second images is computed. At operation 56, the direction of the lateral movement between the first and second images is also determined. At operation 58, pixel correlation processing (image registration) can be performed on the first and second images in the determined direction of the lateral movement. At operation 60, the peak of correlation is computed for each pixel in the computed direction of the lateral movement. At operation 62, the distance in shift of each pixel is computed based on the computed peak of correlation and the amount and direction of the lateral movement. It should be noted that because the amount and direction of lateral movement can be detected to calculate distance, various embodiments of the technology disclosed herein need not rely upon the use of a "baseline" or predetermined/set displacement from an object of interest when capturing an image, which is often the case with prior art systems and methods.

It should further be noted that all of the captured images can be individually displayed to a user so that the preferred picture from which the 3D image is created can be selected. For example, in a scenario where the object of interest is moving, the user may select the picture that captures the moving object is in the preferred position with respect to the image frame. Each capture image uses the pixel data/information from all other captured images to generate and display a depth map. It should be noted that as previously discussed, one improvement over conventional 3D imaging systems (relying on, e.g., stereoscopic imaging) is that only a single image is ultimately used to create and display a 3D image to the user. This avoids any issues with image artifacts that can be experienced when utilizing conventional methods of 3D imaging. Again, the other captured images are only used to generate a depth map. Should a stereoscopic image be desired, it would still be generated from a single photograph. Moreover, it should be noted that as perspective changes (as a result of the user-induced lateral camera movement), different portions of an image may become visible. To "fill in" these regions on the edges of nearby objects, data from multiple photographs may be used, since every photograph has an associated depth map.

In addition to creating 3D images, various embodiments of the technology disclosed herein can be leveraged to provide additional features, once the images are captured and pixel depth is calculated as described above. For example, the size of an object can be measured or estimated. While the angular size of an object can be determined from a single photograph, an object's actual size is also dependent on the distance to the object. That is, and when a camera moves laterally, if all or a significant portion of angular motion is compensated for by OIS, the angles associated with the "shift" an object undergoes from the perspective of the camera changes in a way that depends on the size and distance of the object in a unique way. Namely, for a smaller object that is closer, the angles change more than for a larger object that is further away.

Figure 7A:
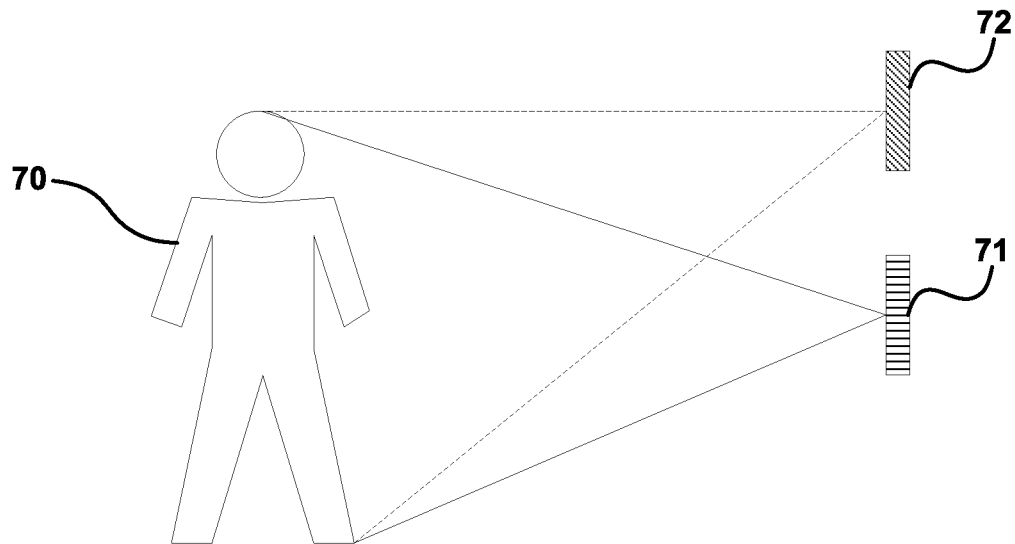
FIGS. 7A and 7B illustrate an example of lateral displacement measurement in accordance with various embodiments of the technology disclosed herein.
Figure 7B:
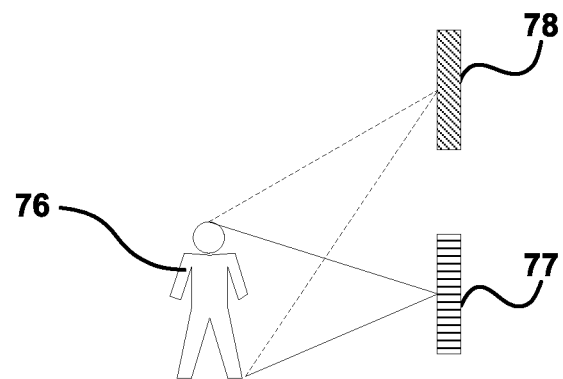

FIGS. 7A and 7B illustrate an example of lateral displacement measurement in accordance with various embodiments. As illustrated in FIGS. 7A and 7B, an object of interest may be a human subject. From the viewpoint of capturing separate images, subjects 70 and 74 may appear to be identical in size to a camera when taking a single photograph. This can be observed from the perspective of the cameras in positions 71 and 75 of FIGS. 7A and 7B, where without additional information, it would be difficult to ascertain the actual size of subjects 70 and 74 and the distance from the cameras to subjects 70 and 74. However, if two images are captured with different lateral positions (e.g., from positions 71 and 77 in FIGS. 7A and 7B, respectively), and the lateral displacement between the positions is known, the size of the object can be quite accurately estimated.

For example, and considering a static or non-moving object, calculations can be performed based on the amount of angular shift between positions 71 and 72. It should be noted that the actual calculations can be based upon representing object shift in degrees of shift, the number of pixels, or some combination thereof. That is, pixels and angles can be considered to be related in this context using a diagonal field of view as a function (e.g., divided by) the total number of pixels in an image. For example, considering a resolution of 12 megapixels, and a 3:4:5: image sensor (3000 pixels by 4000 pixels, with 5000 diagonal pixels), the angle per pixel is 0.014 degrees. Based on this information, the amount of camera lateral movement can be used to estimate the distance to the object, and as a result, the size of the object as well. It should be noted that in accordance with some embodiments, a lateral camera movement of just 1 cm can still result in an object shift large enough to make an accurate distance estimate for an object up to, e.g., 2 m away. Additionally, if an object is ½ m away, using various embodiments, distance can be sensed to a resolution of approximate 0.2% or 1 mm with an accuracy of approximately 0.02 m.

Of course, the margin of error may increase the further away an object of interest is. However, use of acceleration sensing (as described above) can correct for some amount of this error due to more accurate lateral camera movement information. When using three axis OIS, as described above, the moving image sensor package, for example, can be leveraged to determine the acceleration of the camera, and from that, the lateral motion can be determined. In other words, an accurate x-y accelerometer can be integrated into a camera module or host device to ascertain lateral positioning/movement of the host device. Alternatively, separate accelerometers can be used, such as those already incorporated into a mobile device to sense device orientation.

Mathematically, in particular, the distance to an object can be given by the movement distance (of a camera) multiplied by the cotangent of the change in angle. The movement distance can be determined from the aforementioned accelerometers/sensors. Once the distance is known, size can be estimated based on the "angular size" of the object. Mathematically, the size would be the distance multiplied by the tangent of the angular size of the object. Also, any object in an image that has a known size can be used to calculate the distance moved and from that, the size and distance for all other objects in the image can also be determined. For example, the distance between a person's eyes is known and generally a constant. When taking images of a person, this distance can be used to determine the size of everything else in the captured image.

Every pixel in an image can have a distance associated with it. With respect to pixel correlation that is used to determine the depth for each pixel, two images captured to represent two arrays of pixels where the properties of each pixel (e.g. intensity, color) are represented by a matrix A with elements $A_{ij}$ for a first image A, and matrix B with elements $B_{ij}$ for a second image B can be considered. The suffix i represents an image sensor row (y axis) and the suffix j represents an image sensor column (x axis).

The correlation between the first two images is as follows:

$$A=\{A11,A12,A13,\ldots,A21,A22,A23,\ldots\}$$

$$B=\{B11,B12,B13,\ldots,B21,B22,B23,\ldots\}$$

The direction of movement of the camera, as described above, can be detected. For the sake of simplicity, assume that a static object is the scene and that the camera movement is in the x direction, corresponding to the suffix j in the image matrices. As a result, the correlation for pixels between these two images can be computed for pixel shifts in the j direction. It should be noted that the same formulas, methods described herein can be applied to moving objects through extrapolation using vector projections.

The correlation for each pixel is calculated by taking the difference between the shifted pixels in image B and the un-shifted pixel in image A. The calculation need only go as far as the maximum shift in pixels that could result from the measured movement, corresponding to an object that is at the closest distance of, for example, 5 cm away from the camera. By taking this maximum pixel shift to be N (peak correlation), the correlation array for the first column and first row pixel is given by:

$$C11=\{B11-A11,B12-A11,B13-A11,\ldots B1N-A11, B1N+1-A11\}$$

This array will have a minimum at a certain pixel shift corresponding to the shift in the image caused by the camera movement. An appropriate algorithm can determine what this shift is by detecting the minimum and counting the position in the array. For purposes of this description, this can be referred to as a number X11.

In general the array for each pixel is given by:

$$C_{ij}=\{B_{ij}-A_{ij},B_{ij}+1-A_{ij},B_{ij}+2-A_{ij},\ldots B_{ij}+N-A_{ij}\}$$

The minimum in this array is given by position $X_{ij}$.
A matrix X can then be created:

$$X=\{X11,X12,X13,\ldots,X21,X22,X23,\ldots\}$$

This matrix may be filtered to eliminate excess noise. For example, the color matrix may be used to determine where one object starts and another begins, helping to determine if the change in depth is real or not. These pixel shifts indirectly provide information about the depth for each pixel in a scene/image. The larger the depth for that pixel, the less the shift and vice versa, i.e., the smaller the depth for that pixel, the larger the shift.

Moreover, pixel blur can also be leveraged in accordance with other embodiments. In this case, a sharpness score can be assigned to regions of an image and compared with the recorded motion during exposure. From this, depth for each pixel may also be computed. That is, a user can focus on an object and take a picture. There will be different levels of blurring on different points of object, e.g., with curved object, aspects closer to the camera may have more blur, whereas aspects of the object that are further away will have less, depending on the focal point(s). Accordingly, the sharpness across an image can be analyzed to determine the depth of pixels.

Figure 8:
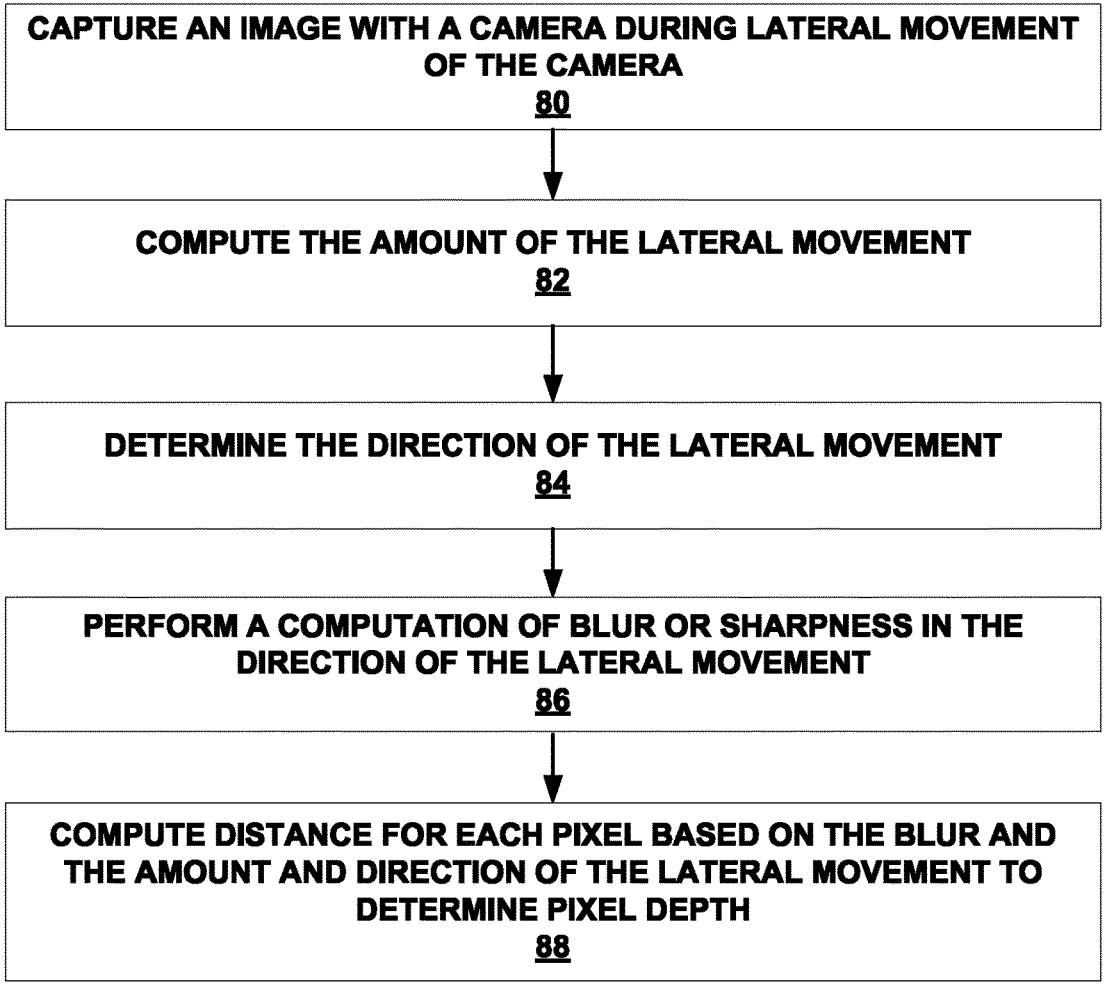
FIG. 8 is an operational flow chart illustrating example processes performed for achieving three dimensional imaging utilizing blur or sharpness data in accordance with various embodiments of the technology disclosed herein.

FIG. 8 is an operational flow chart illustrating example processes performed for determining pixel depth via blur computations in accordance with various embodiments. At operation 80, an image is captured with a camera during lateral movement of the camera. Again, only a single camera is utilized in 3D imaging in accordance with this embodiment, and the concept of "lateral" motion or movement refers to movement in the X-Y plane. Other movements such as pitch, yaw and roll are effectively cancelled by the OIS operation. This lateral movement can be circular motions, back and forth motions, or simply shifting/moving the camera horizontally, vertically, diagonally, etc. within the X-Y plane, such movement can be user-determined or a user can be prompted with instructions regarding what lateral movements to make with the camera.

At operation 82, the amount of the lateral movement is computed. The lateral movement of the camera is tracked during exposure (e.g., during a single shutter cycle). At operation 84, the direction of the lateral movement is also determined. At operation 86, a computation to score or otherwise determine the level of blur (or alternatively, the sharpness because blur may be considered to be the "inverse" of sharpness or lack thereof) is performed for each pixel in the determined direction of movement. At operation 88, the distance of each pixel is computed based on the computed blur and the amount and direction of the lateral movement. It should be noted that the method may further comprise executing an algorithm to correct for the blur or lack of sharpness after pixel depth has been determined.

Even though blur may be minimal in some instances, resulting in smaller divergences of depth, distance can still be estimated. Where OIS may normally be used to remove blur, because various embodiments utilize 3 axis OIS, there will still be some amount of blurring as a result of lateral movement which is distance dependent. It should be noted that taking images with longer exposures can create greater pixel shift that can be leveraged in making the above-noted calculations to achieve more accurate pixel depth information. This can come at the expense of images that are less sharp, but sharpness can be addressed by post-processing to digitally remove blur in a final image.

Figure 9:
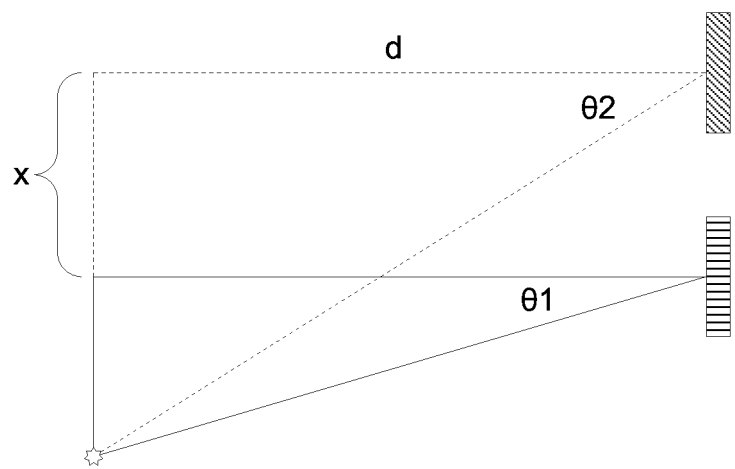
FIG. 9 illustrates an example of depth measurement in accordance with various embodiments of the technology disclosed herein.

FIG. 9 illustrates an example of depth measurement. If x is the magnitude of the movement of the camera between the two captured images, d can be the depth of the point source illuminating an actual pixel, θ1 can be the angle location of the pixel in the first image, and θ2 can be the angle location of the pixel in the second image. It should be noted that a single point source of illumination is disclosed herein for simplicity's sake in describing the concept of pixel depth calculations in accordance with various embodiments. However, in an actual image where light can be irradiated from and/or reflected from any object surface(s) (e.g., a distributed light source or reflector), the same or similar concepts can be applied. Additionally, point source in the context of the technology disclosed herein can be thought of as the depth of the portion of an object in a scene that generates the light illuminating a pixel. The depth d can then be calculated by the following formula:

$$d = x/(\tan \theta 2 - \tan \theta 1)$$

The difference in tangents of the two angles is related to the shift X as follows:

$$\tan \theta 2 - \tan \theta 1 = X^*(p/f)$$

where p is the size of each pixel and f is the effective focal length of the camera lens.

Joining these two equations, the depth $d_{ij}$ for each pixel can be calculated using the following formula:

$$d_{ij} = (x/X_{ij})^*(f/p)$$

For example, if the camera has a focal length f of 5 mm, pixel size p of 1.2 um, camera movement x is 6 cm, and the pixel shift Xij is 50 pixels, the depth at that pixel dij is 5 meters.

The depth matrix is then given by:

$$D = \{d11, d12, d13, \ldots, d21, d22, d23, \ldots\}$$

Accordingly, the depth at each pixel can be calculated and saved as part of a captured image. As described above, a resulting pixel depth map can be created and combined with a selected image to create a 3D image.

As previously discussed, other camera parameters can be used to calculate depth. For example, focal length and pixel size are interrelated with field of view and image sensor size.

Although various embodiments described thus far disclose methods for capturing images in substantially the same effective orientation by using OIS (although some methods of OIS maintain a camera in the same orientation, other OIS methods allow the camera to change orientation, but substantially compensate for that movement by either movement of the lens or the image sensor), this is not required. Examples of embodiments related to the orientation of the camera during the capture of a plurality of photographs are as follows. In accordance with one embodiment, a viewing angle could be changed purposefully between the capturing of images. For instance, if an object is very close, it may be desirable to change the viewing/pointing angle of the camera. In this case, the pixel shift related to this change in orientation would be taken into account during pixel correlation to ensure the pixel shift is not incorrectly attributed to depth.

In accordance with another embodiment, the viewing angle could be allowed to change. In this case, the change in viewing angle would be tracked by the aforementioned sensors/gyroscopes and the related pixel shift could be subtracted from the pixel correlation that determines the depth for each pixel. Additionally, the viewing angle could be allowed to change somewhat, but corrected to be a specific multiple of a pixel in order to keep the shift caused by an orientation change to be an integer multiple of a pixel. Further still, the viewing angle could be allowed to change in one direction but corrected by OIS in another direction. For example, shifts in pitch and yaw may be allowed, but any shift in roll corrected. This may be advantageous in certain scenarios because pixel shifts that are vertical and horizontal are easier to address algorithmically than rotational shift in a "rolling" direction. Alternatively, roll could allowed and pitch and yaw corrected, or any other combination thereof.

Figure 10:
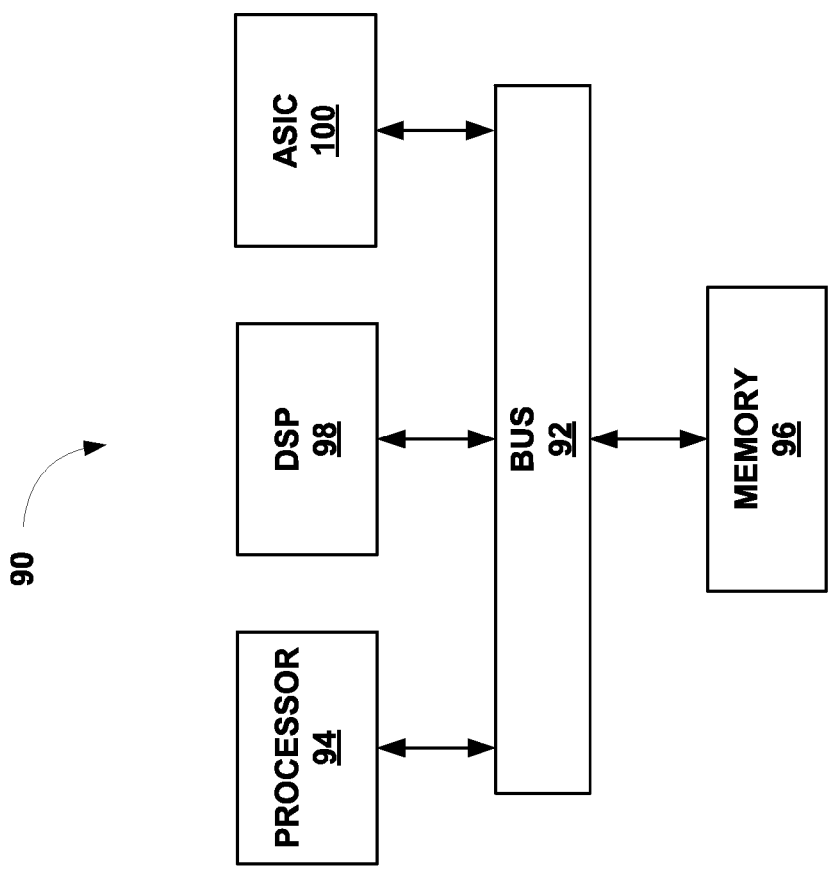
FIG. 10 illustrates an example chip set that can be utilized in implementing architectures and methods for 3D imaging in accordance with various embodiments of the technology disclosed herein.

FIG. 10 illustrates a chip set/computing module 90 in which embodiments of the technology disclosed herein may be implemented. Chip set 90 can include, for instance, processor, memory, and additional image components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 90 includes a communication mechanism such as a bus 92 for passing information among the components of the chip set 90. A processor 94, such as an image processor has connectivity to bus 92 to execute instructions and process information stored in a memory 96. A processor may include one or more processing cores with each core configured to perform independently. Alternatively or in addition, a processor may include one or more microprocessors configured in tandem via bus 92 to enable independent execution of instructions, pipelining, and multithreading. Processor 94 may also be accompanied with one or more specialized components to perform certain processing functions and tasks such as one or more digital signal processors, e.g., DSP 98, such as an OIS DSP, image sensor, OIS gyroscope, and/or one or more application-specific integrated circuits (IC) (ASIC) 100, such as that which can be utilized to, e.g., drive a MEMS actuator for achieving OIS, zoom, and/or AF functionality. DSP 98 can typically be configured to process real-world signals (e.g., sound) in real time independently of processor 94. Similarly, ASIC 100 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The aforementioned components have connectivity to memory 96 via bus 92. Memory 96 includes both dynamic memory (e.g., RAM) and static memory (e.g., ROM) for storing executable instructions that, when executed by processor 94, DSP 98, and/or ASIC 100, perform the process of example embodiments as described herein. Memory 96 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 90. After reading this description, it will become apparent to a person skilled in the relevant art how to implement the application using other computing modules or architectures.

In this document, the terms "computer program medium" and "computer usable medium" are used to generally refer to transitory or non-transitory media such as, for example, memory 96, or other memory/storage units. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 90 to perform features or functions of the present application as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   capturing a first image with a camera;
   capturing at least a second image subsequent to lateral movement of the camera;
   computing the amount of the lateral movement;
   determining a direction of the lateral movement;
   performing correlation of pixels in the first and second images in the direction of the lateral movement;
   computing peak of correlation for each pixel in the direction of the lateral movement;
   computing distance from the camera for each pixel based on the peak of the correlation and the amount and the direction of the lateral movement; and
   generating a three-dimensional image based upon the distance from the camera for each pixel.

2. The method of claim 1, wherein the lateral camera movement comprises a location change between a first position of the camera at which the first image is captured and a second position of the camera at which the second image is captured.

3. The method of claim 1, wherein the lateral camera movement comprises movement within the X-Y plane parallel to the plane at which the first and second images are captured.

4. The method of claim 3, wherein the lateral camera movement comprises at least one of a circular movement within the X-Y plane, a back-and-forth movement within the X-Y plane, a vertical movement along the Y axis of the X-Y plane, and a horizontal movement along the X axis of the X-Y plane.

5. The method of claim 1, wherein the second image and the first image are captured with substantially the same effective orientation.

6. The method of claim 1, wherein the camera employs optical image stabilization in compensating for roll, pitch, and yaw movement of the camera to limit observed pixel movement between capturing the first and second images to pixel movement resulting from the lateral movement of the camera.

7. The method of claim 6, wherein the performing of the correlation comprises distinguishing between the pixel movement resulting from the lateral movement of the camera and the pixel movement associated with the movement of at least one object between the capturing of the first and second images.

8. The method of claim 1, further comprising selecting one of the first and second images to generate the three-dimensional image based upon pixel depth information of the one of the first and second images and the other of the first and second images.

9. The method of claim 8, wherein the pixel depth information comprises a depth of a point source illuminating a pixel.

10. The method of claim 9, wherein the depth of the point source is a function of the amount of the lateral movement of the camera, the location of the pixel in the first image, and the location of the pixel in the second image corresponding to the pixel in the first image.

11. The method of claim 1, wherein the performance of the correlation comprises determining a difference between reference pixels in the first image and shifted pixels in the second image.

12. The method of claim 1, further comprising applying filtering to correlation information resulting from the performance of the correlation to reduce noise.

13. The method of claim 1, wherein the second image and the first image are captured with different orientations.

14. The method of claim 1, further comprising computing a size measurement of at least one object in at least one of the first and second images based upon the computed distance for each pixel.

15. A method, comprising:
    capturing an image with a camera during lateral movement of the camera;
    computing the amount of the lateral movement;
    determining a direction of the lateral movement;
    performing a computation of the blur or sharpness in the direction of the lateral movement; and
    computing distance from the camera for each pixel based on the blur and the amount and the direction of the lateral movement to determine pixel depth of each pixel; and
    generating a three-dimensional image based upon the distance from the camera for each pixel.

16. The method of claim 15, wherein performing the computation of the blur or sharpness comprises assigning a sharpness score to each region of the image.

17. The method of claim 16, wherein the performing the computation of the blur or sharpness further comprises comparing the sharpness score to recorded motion.

18. The method of claim 15, further comprising correcting the blur or improving the sharpness subsequent to determining the pixel depth of each pixel.

19. A device, comprising:
    a memory configured to store instructions; and
    a processor, operatively coupled to the memory and configured to execute the instructions, the instructions causing the processor to:
    capture a first image with a camera;
    capture at least a second image subsequent to lateral movement of the camera;
    compute the amount of the lateral movement;
    determine a direction of the lateral movement;
    perform correlation of pixels in the first and second images in the direction of the lateral movement;
    compute peak of correlation for each pixel in the direction of the lateral movement;
    compute distance from the camera for each pixel based on the peak of the correlation and the amount and the direction of the lateral movement; and
    generating a three-dimensional image based upon the distance from the camera for each pixel.

20. The device of claim 19, wherein the instructions further cause the processor to select one of the first and second images to generate the three-dimensional image based upon pixel depth information of the one of the first and second images and the other of the first and second images.

21. The device of claim 20, wherein the pixel depth information comprises a depth of a portion of an object captured in the first and second images that generates light that illuminates a pixel.

22. The device of claim 21, wherein the depth of the light generating portions is a function of the amount of the lateral movement of the camera, the location of the pixel in the first image, and the location of the pixel in the second image corresponding to the pixel in the first image.

23. The device of claim 19, wherein the instructions causing the processor to perform the correlation comprise instructions causing the processor to determine a difference between reference pixels in the first image and shifted pixels in the second image.

24. The device of claim 19, wherein the instructions further cause the processor to compute a size measurement of at least one object in at least one of the first and second images based upon the computed distance for each pixel.

25. A device, comprising:
a memory configured to store instructions; and
a processor, operatively coupled to the memory and configured to execute the instructions, the instructions causing the processor to:
capture a first image and a second image with a camera, wherein the effective orientation of the camera is stabilized in at least three axes to compensate for roll, pitch, and yaw movements, and wherein capturing the second image is performed subsequent to lateral movement of the camera;
compute the amount of the lateral movement;
determine a direction of the lateral movement;
perform correlation of pixels in the first and second images in the direction of the lateral movement;
compute peak of correlation for each pixel in the direction of the lateral movement; and
compute distance from the camera for each pixel based on the peak of the correlation and the amount and the direction of the lateral movement; and
generating a three-dimensional image based upon the distance from the camera for each pixel.

26. The device of claim 25, wherein the instructions further cause the processor to select one of the first and second images to generate the three-dimensional image based upon pixel depth information of the one of the first and second images and the other of the first and second images.

27. The device of claim 25, wherein the device is a mobile computing device.

* * * * *